(12) United States Patent
Hoshino et al.

(10) Patent No.: US 8,087,154 B2
(45) Date of Patent: Jan. 3, 2012

(54) MOTOR

(75) Inventors: Akinori Hoshino, Nisshin (JP); Haruji Suzuki, Kariya (JP); Shusaku Kamio, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 642 days.

(21) Appl. No.: 11/889,763

(22) Filed: Aug. 16, 2007

(65) Prior Publication Data

US 2008/0054751 A1 Mar. 6, 2008

(30) Foreign Application Priority Data

Aug. 29, 2006 (JP) ................................. 2006-231570
May 21, 2007 (JP) ................................. 2007-134384

(51) Int. Cl.
*H02K 15/02* (2006.01)

(52) U.S. Cl. .......... 29/596; 29/598; 29/732; 310/156.56
(58) Field of Classification Search ............ 29/596–598, 29/732–736; 310/156.56, 216.058, 90, 42, 310/67 R, 89–91
See application file for complete search history.

(56) References Cited

U.S. PATENT DOCUMENTS

| 4,999,533 | A | * | 3/1991 | King et al. ...................... 310/90 |
| 5,889,342 | A | * | 3/1999 | Hasebe et al. ................... 310/54 |
| 6,700,288 | B2 | * | 3/2004 | Smith ..................... 310/216.023 |
| 7,019,427 | B2 | * | 3/2006 | Sasaki et al. ............. 310/156.78 |
| 7,279,821 | B2 | * | 10/2007 | Fukushima et al. ..... 310/156.53 |
| 7,507,014 | B1 | * | 3/2009 | League et al. ............. 366/172.1 |
| 7,619,343 | B2 | * | 11/2009 | Weihrauch et al. ...... 310/156.78 |
| 8,020,280 | B2 | * | 9/2011 | Fukumaru et al. ............. 29/598 |
| 2006/0131977 | A1 | * | 6/2006 | Weihrauch et al. ...... 310/156.56 |

FOREIGN PATENT DOCUMENTS

JP 2005-304177 A 10/2005

* cited by examiner

*Primary Examiner* — Minh Trinh
(74) *Attorney, Agent, or Firm* — Buchanan Ingersoll & Rooney P.C.

(57) ABSTRACT

A motor includes a core having a plurality of laminations, which are stacked together and an end-plate provided at an end surface of the core and supporting the core, wherein the end-plate is formed by pressing a hollow material in one direction thereof in order to plastically deform the hollow material in a plate-shape.

16 Claims, 5 Drawing Sheets

MOTOR

CROSS REFERENCE TO RELATED APPLICATIONS

This application is based on and claims priority under 35 U.S.C. §119 to Japanese Patent Application 2006-231570, filed on Aug. 29, 2006 and Japanese Patent Application 2007-134384, filed on May 21, 2007 the entire contents of which are incorporated herein by reference.

FIELD OF THE INVENTION

The present invention relates to a motor that has end-plates supporting a core of the motor.

BACKGROUND

Generally, a motor includes two end-plates provided at both ends of a core which is configured with a plurality of laminations. The core is sandwiched by the two end-plates in an axial direction of a shaft of a motor, or in a stacking direction where the plurality of the laminations are stacked. Generally, when current is supplied to a coil, a magnetic flux has to be generated within the motor only in a circumferential direction of the core. Generally, a nonmagnetic material is used for each of the two end-plate, which is provided to the motor in an axial direction of a shaft. Further, generally, each of the two end-plates is formed in a doughnut shaped plate by stamping out a long-shaped nonmagnetic material through a press process.

In JP2005304177A, the nonmagnetic material is used only for certain sites necessary, for example, the nonmagnetic material is used for a portion of an end-plate contacts a magnet or a part of a core having a plurality of laminations in order to reduce an amount of the nonmagnetic material used for the end-plate. In this publication, two end-plates are provided to the motor in order to sandwich the core. Additionally, in JP2005304117A, surfaces of each of the two end-plates are formed to be flat so that the each of the two end-plates contacts both ends of the core on its flat surfaces.

Generally, the end-plates are formed in a ring-shape by stamping out a long plate through the press process. However, forming the end-plates in the ring shape by stamping out the long plate leaves the rest of the long plate as waste materials. Therefore, in general, a large amount of the waste materials are created when the long plate is stamped out to form the end-plates.

Generally, the nonmagnetic material is more expensive than a magnetic material. In a process where the end-plates are formed by stamping out the long plate, the rest of the long plate used is discarded as the waste materials. Hence, a general process of stamping out a long plate made of the nonmagnetic material in order to form the end-plates decreases a level of a material yield and increases manufacturing costs of the end-plates.

On the other hand, in the way where each of the two end-plates is made of a combination of the nonmagnetic material and the magnetic material as disclosed in JP2005304177A, the amount of usage of the nonmagnetic material is reduced by using the nonmagnetic material to the certain sites of each of the two end-plates and by using the magnetic material to the rest of each of the two end-plate. In JP2005304177A, the nonmagnetic material is used, for example, for the portion of each of the two end-plates at which each of the two end-plates contacts the magnet or for the portion of each of the two end-plates at which each of the two end-plates contacts a part of the core including the plurality of laminations. However, in this configuration, additional processes for manufacturing the nonmagnetic end-plates and magnetic end-plates separately, and for combining the nonmagnetic end-plates and the magnetic end-plates may be needed. As a result, the manufacturing costs will be increased.

In general, the core including the plurality of the laminations and the end-plates are both formed by being stamped out through the press process. Therefore, warpage may be generated on the core and the end-plates, which results in insufficient contact between the end of the core and the end-plates.

In order to advance a performance of the motor, an external diameter of a rotor is enlarged or rotational speed of the rotor is increased. As a result, external force applied to the core of the rotor is also increased.

An outer portion of the core may be damaged if the core including the plurality of the laminations is not sufficiently press-fitted by means of the two end-plates from the both sides of the core.

A need thus exists to provide a motor which is not susceptible to the drawback mentioned above.

SUMMARY OF THE INVENTION

According to an aspect of the present invention, a motor 1 includes a rotor core 21 having a plurality of laminations, which are stacked together and an end-plate 22 provided at an end surface of the rotor core 21 and supporting the rotor core 21, wherein the end-plate 22 is formed by pressing a pipe material 31 in one direction thereof in order to plastically deform the pipe material 31 in a plate-shape.

Accordingly, the end-plate 22 is made of the pipe material 31. Further, the end-plate 22 is arranged at an end surface of the rotor core 21 including the plurality of the laminations in order to support the rotor core 21. The pipe material 31 is pressed in the axial direction thereof from either the end portion 33 or the other end portion 34 of the pipe material 31 in order to plastically deform the pipe material 31 in the plate-shape. Therefore, the amount of the waste materials produced during the manufacturing process of the end-plate 22 is reduced and the productivity is improved. As a result, the manufacturing costs of the end-plate 22 are reduced.

According to another aspect of the present invention, a motor 1 includes a rotor core 21 having a plurality of laminations, which are stacked together and two end-plates 22 provided at end surfaces of the rotor core 21 and supporting the rotor core 21 from both sides thereof in an axial direction of the rotor core 21, wherein each of the two end-plates 22 is formed by pressing a pipe material 31 in one direction thereof in order to plastically deform the pipe material 31 in a plate-shape.

Accordingly, each of the two end-plates 22 is made of the pipe material 31. Further, the two end-plates 22 are provided on the both end surfaces of the rotor core 21 including the plurality of the laminations in order to support the rotor core 21. The pipe material 31 is pressed in the axial direction thereof from either the end portion 33 or the other end portion 34 of the pipe material 31 in order to plastically deform the pipe material 31 in the plate-shape. Therefore, the amount of the waste materials produced during the manufacturing process of the end-plates 22 is reduced and the productivity is improved. As a result, the manufacturing costs of the end-plates 22 are reduced. The two end-plates 22 are provided to the motor in order to sandwich the rotor core 21 including the plurality of the laminations from both sides thereof."

According to a further aspect of the present invention, a method for manufacturing an end-plate 22 in a plate-shape applied to a motor 1 includes a fixing process for fixing pipe materials 31 and 32 and an enlarging process for enlarging the pipe materials 31 and 32 by pressing the pipe materials 31 and 32 in one direction thereof.

Accordingly, the end-plate 22 is made of the pipe material 31 or the pipe material 32. Further, the end-plate 22 is arranged at an end surface of the rotor core 21 including the plurality of the laminations in order to support the rotor core 21. The pipe material 31 or the pipe material 32 is pressed in the axial direction thereof from either the end portion 33 or the other end portion 34 of the pipe material 31 or the pipe material 32 in order to plastically deform the pipe material 31 or the pipe material 32 in the plate-shape. Therefore, the amount of the waste materials produced during the manufacturing process of the end-plate 22 is reduced and the productivity is improved. As a result, the manufacturing costs of the end-plate 22 are reduced

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

First Embodiment

Figure 1:
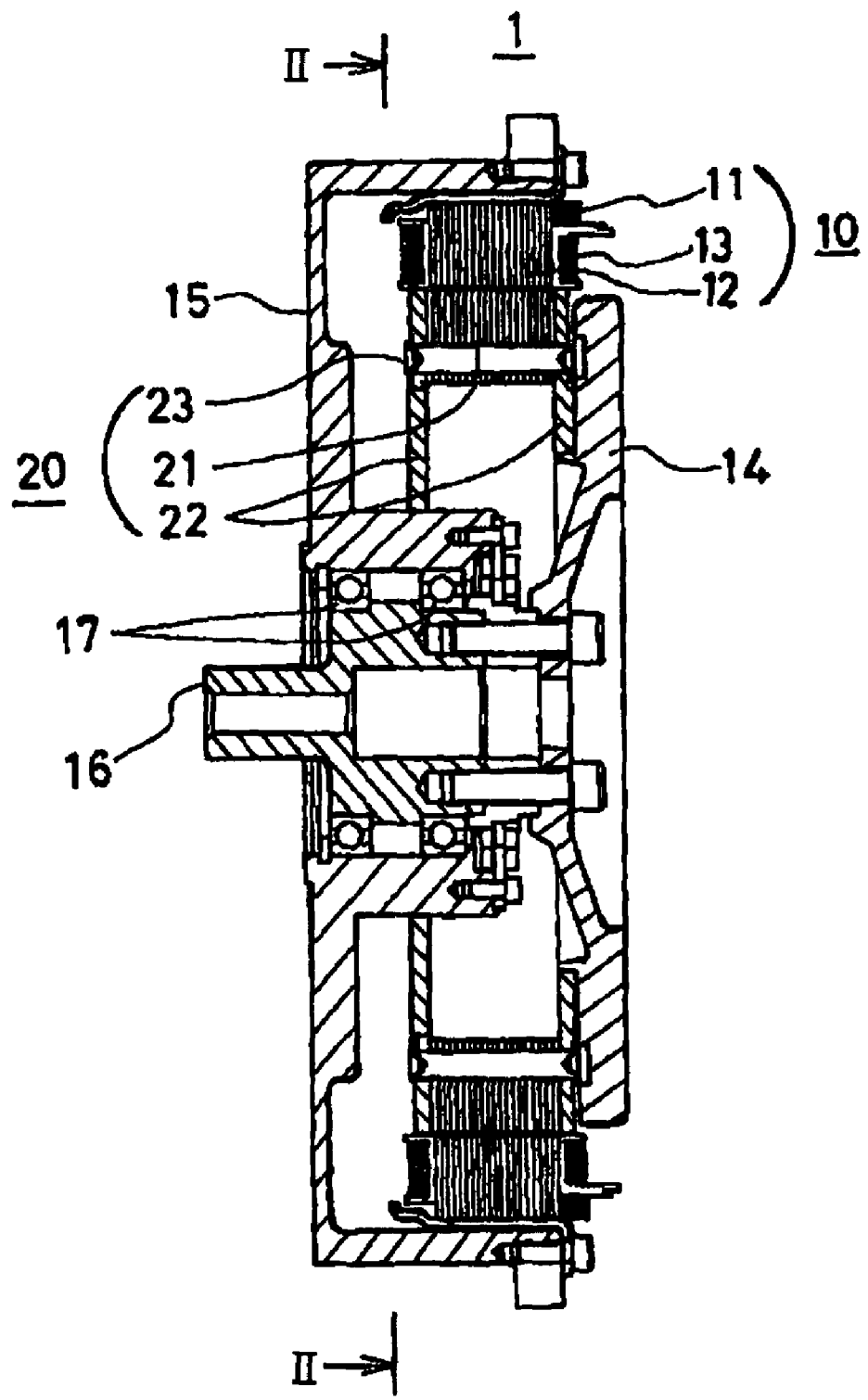
FIG. 1 illustrates a cross-sectional diagram of the motor relating to the embodiment of the present invention.

An embodiment of the present invention will be explained in accordance with the attached drawings. FIG. 1 illustrates a cross-sectional diagram of a motor 1, to which end-plates 22 related to the present invention is applied. As shown in FIG. 1, the motor 1 mainly includes a housing 15, a stator 10, a rotor 20 and a flywheel 14. The housing 15 is formed in a cylindrical shape and has a bottom portion. A boss portion is formed on a central portion of the bottom portion of the housing 15. Bearings 17 (ball bearings) are provided along an inner circumference of the boss portion. A shaft 16 is freely rotatably supported via the two bearings 17. The flywheel 14 is fixed to the shaft 16 by means of six bolts. The rotor 20 is supported by the flywheel 14 and is arranged coaxially with the housing 15 and the flywheel 14. The rotor 20 is rotatable relative to the housing 15. The stator 10 is arranged between the housing 15 and the flywheel 14. Further, the stator 10 is provided at a position where the rotor 20 and the stator 10 are facing with each other. The stator 10 is provided along an outer portion of the rotor 20.

The rotor 20 is arranged coaxially with the shaft 16. A rotor core 21 includes a plurality of laminations, which are made of magnetic steel sheets, being stacked in an axial direction of the shaft 16. Further, two end-plates sandwich or support the rotor core 21 from the both sides thereof in the axial direction of the shaft 16 or in a stacking direction where the plurality of the laminations are stacked. In other words, the two end-plates 22 are provided on the both sides of the rotor core 21 in order to support the rotor core 21. The rotor 20 is housed within the housing 15 at a position where the rotor 20 does not contact an inner wall of the housing 15. Further, the rotor 20 is fixed to the shaft 16 via the flywheel 14.

Hereinafter, the configuration of the end-plates 22 will be explained in detail.

Figure 2:
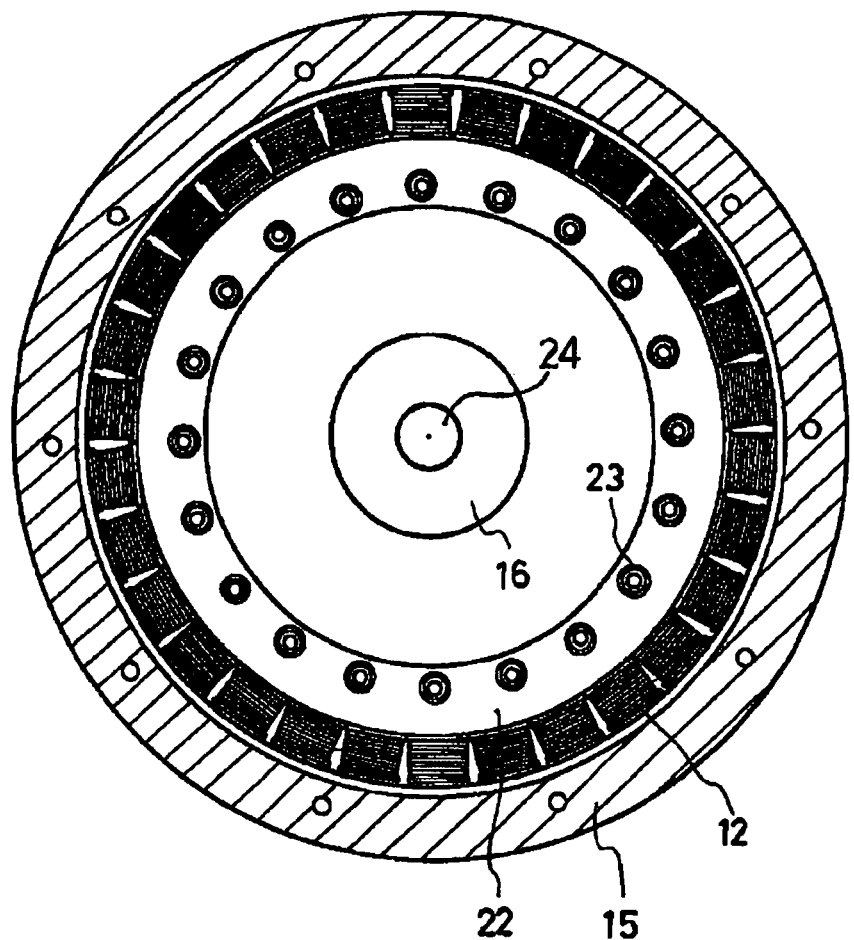
FIG. 2 schematically illustrates a cross-sectional diagram of the motor taken along line II-II of FIG. 1.

FIG. 1 illustrates the cross-sectional diagram of the motor 1 showing a state where the two end-plates 22 are assembled. FIG. 2 illustrates a schematic cross-sectional diagram of the motor 1 taken along line II-II of FIG. 1.

The two end-plates 22 are formed in a disc shape, whose outer circumference corresponds to that of the rotor core 21. A shaft hole 24 is formed on each of the two end-plates 22. The shaft 16 is inserted into the shaft hole 24 and the two end-plates 22 are engaged with the shaft 16. The two end-plates 22 sandwich the rotor core 21 from the both sides thereof in the stacking direction where the plurality of the laminations are stacked. Further, providing the two end-plates 22 to the rotor core 21 prevents magnetic flux from being leaked in the axial direction of the rotor core 21. The two end-plates 22 support the rotor core 21 so as not to move in the axial direction of the shaft 16 and in a radial direction of the end-plates 22. In this configuration, a space between the stator 10 and the rotor core 21 is maintained therebetween. Additionally, providing the two end-plates 22 to the rotor core 21 prevents the rotor core 21 including the plurality of the laminations from being disengaged because of centrifugal force being generated while the rotor 20 is rotated and acted on the rotor core 21.

Figure 3:
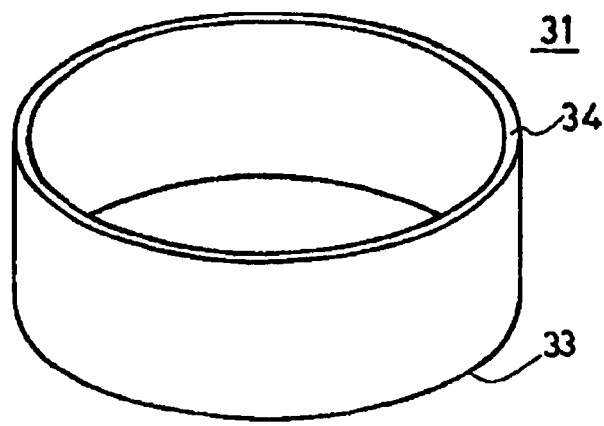
FIG. 3 illustrates a perspective view of a pipe material (a hollow material), which is used as material for an end-plate.

The two end-plates 22 and the rotor core 21, including the plurality of the laminations, are fixed together by means of a rivet pin 23 or the like. For example, as shown in FIG. 2, in this embodiment, twenty rivet pins 23 are provided to each of the two end-plates 22 in a circumferential direction of the end-plates 22 in order to integrally fix each of the two end-plates 22 to the rotor core 21. The two end-plates are made of nonmagnetic material, for example, stainless steel, copper or the like. Hereinafter, a manufacturing method of the end-plates 22 will be explained with one of the two end-plates 22 as an example, in accordance with the FIG. 3. The other one of the two end-plates 22 is also manufactured in the same manufacturing method as the one of the two end-plates 22.

A nonmagnetic pipe material 31 (a hollow material 31) is used for a end-plate 22 in this embodiment. A welded steel pipe is used for the hollow material 31. In this embodiment, the welded steel pipe includes pipes explained as follows. The welded steel pipe is a steel pipe processed through a rolling operation or a press operation, through which a steel plate or a coil is rolled or pressed in order to form the steel plate or the coil in a pipe shape, and then the rolled or pressed steel pipe is processed through a welding operation, through which a joint of the pipe is welded. The welded steel pipe is a steel pipe manufactured by a coil being processed through a heat treatment in a furnace, a rolling process to form a pipe shape, and then a press-bonding process to press-bound a joint of the pipe. The welded steel pipe is a steel pipe manufactured by a coil being rolled, by applying an alternating-current to a join of the rolled coil, and then by heating the rolled coil to which the alternating-current is applied in order to press-bound the joint of the rolled coil.

Length of the pipe material 31 is determined depending on size of an outer circumference of the end plate 22. An internal diameter of the pipe material 31 is determined depending on size of an internal circumference of the end-plate 22 formed in a ring shape.

Figure 8:
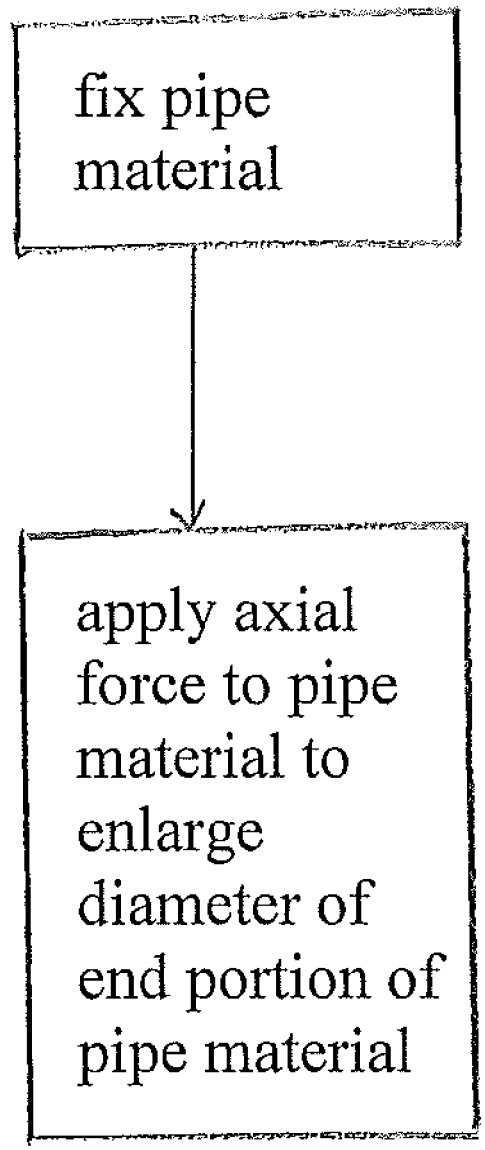
FIG. 8 schematically illustrates aspects of the method for manufacturing an end-plate to be applied to a motor.

As schematically illustrated in FIG. 8, the pipe material 31 is fixed so as not to move during the plastically deforming process (a fixing process). A diameter of one end portion 33 of the pipe material 31 is enlarged (an enlarging process) in a radial direction of the pipe material 31 when pressure is applied to an other end portion 34 of the pipe material 31. When the pipe material 31 is further pressed in the axial direction thereof, the one end portion 33 is further and gradually enlarged in the radial direction of the pipe material 31. As a result, an outer diameter of the one end portion 33 of the pipe material 31 becomes an outer diameter of the end-plates 22. The other end portion 34 of the pipe material 32, whose diameter is not enlarged, becomes an internal diameter of the end-plate 22 when the pipe material 31 is pressed in an axial direction thereof from the side of the other end portion 34. As a result of the press operation applied to the pipe material 31, either an outer wall surface or an inner wall surface of the pipe material 31 functions as an inner surface 36, which contacts one of end surfaces of the rotor core 21. One of the end surfaces of the rotor core 21 faces the housing 15, and an other of the end surfaces of the rotor core 21 faces the flywheel 14.

The inner surface 36 includes a tapered surface 37. The inner surface 36 is formed by either the outer wall surface or the inner wall surface of the pipe material 31 being pressed.

The above-mentioned manufacturing method of manufacturing the end-plate 22 by pressing the pipe material 31 in the plate-shape may reduce an amount of waste materials produced when compared to the generally known art that manufactures the end-plate 22 by stamping out a sheet material. In this embodiment, almost all of the pipe material 31 are used to form the end-plate 22, which results in reducing material costs of the end-plate 22.

Additionally, in this invention, the end-plate 22 is manufactured through a plastic process. Therefore, a combining process of combining the nonmagnetic metal parts and the magnetic metal parts in order to obtain the end-plate disclosed in JP2005304177A is not needed. Hence, the end-plate 22 of the present invention is manufactured with less manufacturing processes and further the end-plate of the present invention may be easily manufactured in an automated process. As a result, productive efficiency may be improved, and further manufacturing costs may be reduced.

Moreover, providing the two end-plate 22 having the tapered surface 37 of the embodiment of the present invention to the rotor core 21 may prevent parts of the motor from being disengaged while the motor is driven, comparing to end-plate whose surfaces are formed to be flat as mentioned in the known art. Hence, rotational speed of the motor may be improved and the motor may output higher power.

Either a seamless tube or an electric resistance welded tube may be used as the pipe material 31 in order to form the end-plate 22. However, the material costs of the end-plate 22 made of the electric resistance welded tube is lower than the material costs of the end-plated 22 made of the seamless tube.

The manufacturing method for manufacturing the end-plate 22 may be modified as follows.

Figure 4:
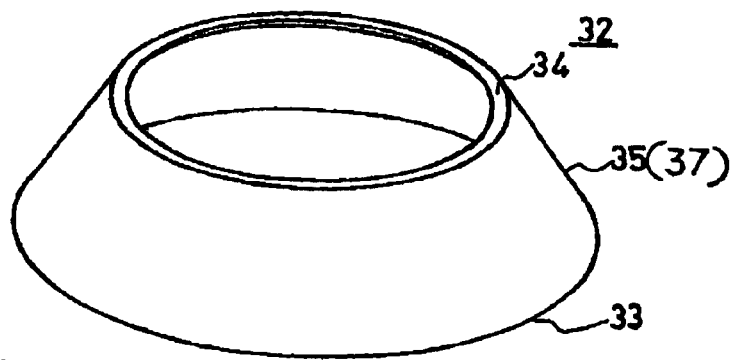
FIG. 4 illustrates a perspective view of the pipe material whose diameter of one end portion thereof is enlarged.

FIG. 4 illustrates a pipe material 32 whose one end diameter is preliminarily enlarged in order to form the end-plate 22 of the embodiment of the present invention.

Generally, when the pipe material 31 is pressed in one direction, for example in an axial direction thereof, a pressing force acts mainly in the axial direction of the pipe material 31 and the pressing force acting in a radial direction is small, because of a straight structure of the pipe material 31. Therefore, a large pressing force is needed when the pipe material 31 is pressed in the one direction thereof in order to outwardly enlarge a diameter of an end portion 33 of the pipe material 31 in the radial direction thereof.

However, by preliminarily enlarging the diameter of the one end portion 33 of the pipe material 31 through the plastic process as shown in FIG. 4, the pressing force acting in the axial direction may be effectively applied in the radial direction as well via a wall portion 35 of the pipe material 32 whose diameter of the one end portion 33 is enlarged. An enlarged angle of the one end diameter of the pipe material 32 shown in FIG. 4 depends on conditions of a material and size used for the pipe material 32 and the pressing force applied to the pipe material 32. For example, in this embodiment, the enlarged angle of the diameter of the one end portion 33 of the pipe material 31 is set to 120 degree.

By configuring the wall portion 35 to be symmetrical with respect to a central axial line of the pipe material 32, when the pipe material is seen in a cross-sectional diagram taken along the axial direction of the pipe material 32, the pressing force may be equally applied to the entire body of the pipe material 32 whose diameter of the one end portion 33 is enlarged.

Under a condition where the enlarged angle of the pipe material 32 is small and inadequate considering the material and the size of the pipe material 32 and the pressing force applied to the pipe material 32, buckling occurs on the pipe material 32 when the pressing force is applied more in the axial direction than in the circumferential direction of the pipe material 32. In other words, the buckling occurs when the pressing force in the axial direction of the pipe material 32 exceeding an allowable stress that the pipe material 32 is capable of withstanding.

Additionally, even if the pipe material 32 is not buckled, a curling phenomenon may occur on a part being pressed during the plastic process. When the curling phenomenon occurs on the part of the pipe material 32 being pressed, the part of the pipe material 32 is curled in a circumferential direction thereof, and as a result, a flat shape is not formed.

The diameter of the one end portion 33 of the pipe material 32 is enlarged in advance in a manner where the pipe material 32 is fixed (the fixing process) so as not to move during the plastically deforming process, and then an inner circumference of the one end portion 33 of the pip material 32 is enlarged in the radial direction thereof (the enlarging process) by means of, for example, a punch for enlarging (not shown). Otherwise, the diameter of the one end portion 33 of the pipe material 32 is enlarged in a manner where the inner circumference of the one end portion 33 of the pipe material 32 is sequentially enlarged by sequentially applying pressure outwardly from an inner circumference of the one end portion 33 by means of the punch for enlarging or the like, while the pipe material 32 is rotated.

Additionally, enlargement of the one end portion 33 of the pipe material 32 may be completed in one process or in multiple processes. For example, the one end portion 33 is enlarged by 60 degrees in a first process and then is further enlarged up to 120 degrees in a second process. When the pipe materials 31 and 32 are enlarged, the one end portion 33 of the pipe material 31 and 32 may be upwardly, downwardly, rightwardly or leftwardly positioned.

Figure 5:
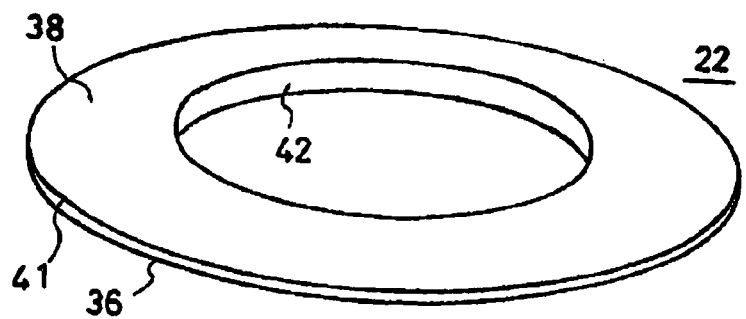
FIG. 5 illustrates a perspective view of a state of the pipe material after the pipe material is pressed in an axial direction of the pipe material.

FIG. 5 illustrates the end-plate 22 formed in a plate-shape having a tapered surface 37 on its outer surface 38 (non-contacting surface). The outer surface 38 does not contact the rotor core 21 when the end-plate 22 is provided to the rotor core 21. The end-plate 22 illustrated in FIG. 5 is formed by pressing the pipe material 32, whose diameter of the one end portion 33 is enlarged, in the axial direction of the pipe material 32. While the pressure is applied to the pipe material 32, the pipe material 32 is enlarged towards the radial direction thereof and is deformed into the end-plate 22. As a result of the pressing process, the pipe material 32 is plastically deformed to obtain the end-plate 22. The end-plate 22 includes the inner surface 36 and the outer surface 38. The end-plate 22 contacts the rotor core 21 at the inner surface 36.

A moving distance of the one end portion 33 in a radial direction of the pipe material 32 is larger than a moving distance of the other end portion 34 in the radial direction of the pipe material 32. The enlarged one end portion 33 of the pipe material 32 corresponds to an outer circumferential periphery 41 of the end-plate 22 as shown in FIG. 5. The inner circumference of the other portion 34 of the pipe material 32 corresponds to an inner circumferential periphery 42 when the pipe material 32 is pressed to from the end-plate 22.

However, in this embodiment, the pipe material 32 is processed in a manner where the moving distances of the one end portion 33 and the other end portion 34 are equalized. As a result of equalizing the moving distances of the one end portion 33 and the other end portion 34, the tapered surface 37 is formed at the outer surface 38, which does not contact the rotor core 21. Specifically, when the plastically deforming process is applied to the pipe material 32, the pipe material 32 is pressed with a mold by which the outer circumferential periphery 41 is formed to be thin and the inner circumferential periphery 42 is formed to be thick, and as a result the tapered surface 37 is formed on the end-plate 22.

As the pipe material 32 is processed so as to have the tapered surface 37, the moving distance at any point of the pipe material 32 is equalized, as a result, a period of pressing time and strength of the pressing force are easily set. Moreover, in this configuration, the pipe material 32 is pressed and enlarged in several manufacturing methods. Further, in this configuration, the end-plate 22 is manufactured with less manufacturing process compared to the manufacturing process for manufacturing the end-plate in the know arts. As a result, the end-plate 22 of the embodiment of the present invention is easily manufactured even in the automated manufacturing process. Hence, the manufacturing costs of the end plate 22 is reduced.

The pressing force may be applied to the pipe materials 32 from a side of the one end portion 33 whose diameter is enlarged by means of a punch or the like, or from a side of the other end portion 34 whose diameter is not enlarged as shown in FIG. 4, by means of the punch for enlarging or the like.

The pipe material 32, whose diameter of the one end portion 33 is enlarged, is fixed on a die and then pressed by the punch for enlarging in the axial direction of the pipe material 32 from the side of the one end portion 33 that is enlarged or from the side of the other end portion 34 that is not enlarged. Or, the pipe material 32 is pressed by means of the punch outwardly in the axial direction of the pipe material 32 from the enlarged one end portion 33, at the same time, the pipe material 32 is pressed by means of the punch or the like from the other end portion 34 in the axial direction of the pipe material 32.

A solution treatment may be applied to the pipe material 32, whose diameter of the one end portion 33 is enlarged, before the pressing force is applied in the axial direction of the pipe material 32 to form the end-plate 22. A nonmagnetic material may be magnetized when it is strained. However, the solution treatment equalizes material components used for the pipe material 32 and restores the magnetized material to be nonmagnetic. Additionally, the nonmagnetic material is heated at approximately 100 degree Celsius to retain a non-magnetic characteristic of the pipe material 32, and then the nonmagnetic material, to which the solution treatment is applied, is processed to from the pipe material 31.

Hereinafter, the operation of the motor 1, which includes two end-plates 22, will be explained.

When an alternating-current is applied to the coil 13 via a bus ring 11 formed in a ring shape from an electric current source (not shown), the stator core 12 and the rotor core 21 are magnetized. Sucking force and repulsion force are generated between the stator core 12 and the rotor core 21. As a result, the rotor 20 is rotated around the shaft 16 when the sucking force and the repulsion force are generated between the stator core 12 and the rotor core 21.

In the case mentioned above, the two end-plates 22 restrain magnetic lines generated on the stator core 12 in an axial direction of the rotor 20. Further, the two end-plates 22 converges the magnetic lines within the rotor 20.

The rotor core 21 is supported or sandwiched by two end-plates 22 from the both sides of the rotor core 21 in the stacking direction where the plurality of the laminations are stacked by means of rivet pins 23, resin material or the like. By supporting or sandwiching the rotor core 21 by the two end-plates 22 and by press-fitting the rotor core 21 and the two end-plates 22, the rotor core 21 is prevented from being disengaged from the rotor 20 because of the centrifugal force.

Second Embodiment

Figure 6:
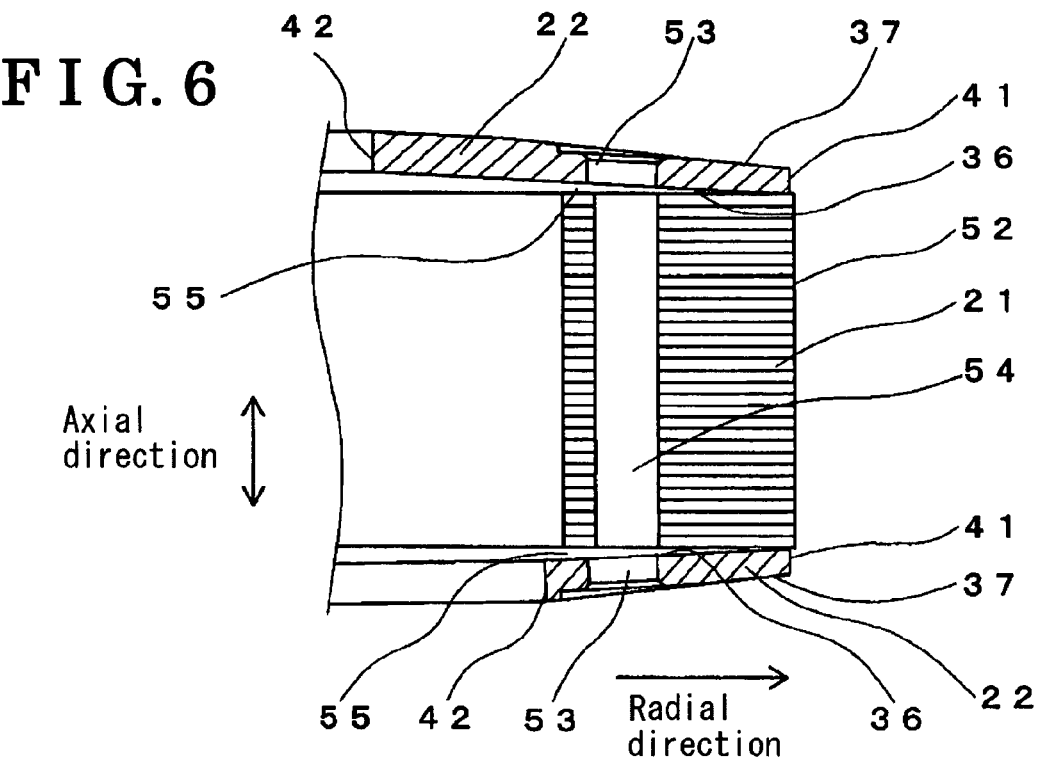
FIG. 6 schematically illustrates a cross-sectional diagram of a rotor in which a rotor core and two end-plates are stacked with each other.
Figure 7:
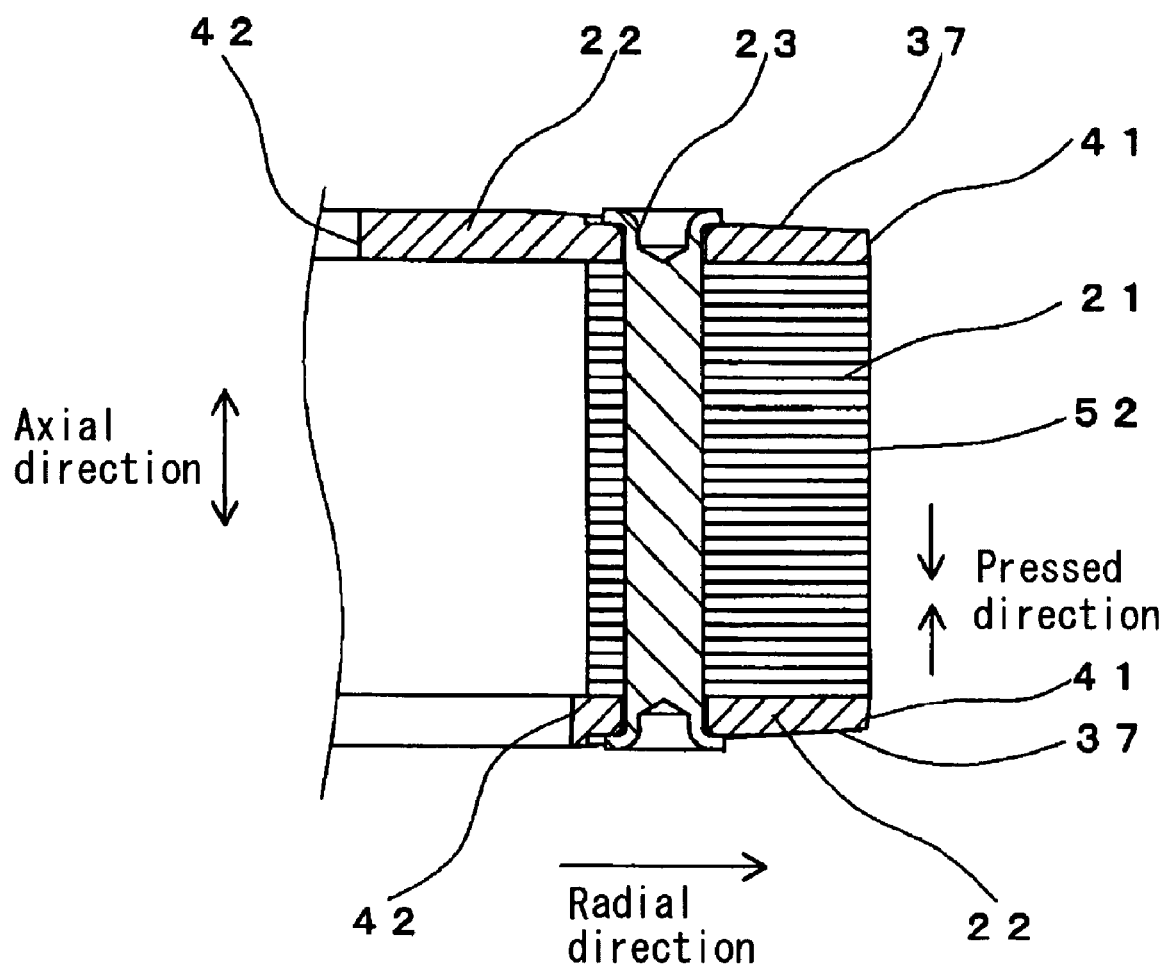
FIG. 7 schematically illustrates a cross-sectional diagram of the rotor in which the rotor core is sandwiched by two end-plates and the rotor core and the two end-plates are fixed together.

To describe the second embodiment, differences between the first and the second embodiments will be focused in accordance with FIG. 5 through FIG. 7. As with the case of the first embodiment, the pipe material 32 is pressed in the axial direction thereof. However, in the second embodiment, the pipe material 32, whose diameter of the one end portion 33 is preliminarily enlarged, is continuously pressed until an inner circumferential surface of the pipe material 32 obtains the inner surface 36 shown in FIG. 5. The inner surface is formed in a tapered shape having a certain degree relative to the axis of the pipe material 32.

The inner surface 36 is formed to be approximately flat and is formed in the tapered shape having a certain degree relative to the axis of the pipe material 32. In other words, the rotor core 21 and the inner surface 36 of each of the two end-plates 22 (from the inner circumferential periphery 42 to the outer circumferential periphery 41) contact each other by forming a degree (an acute degree) therebetween, as shown in FIG. 6. The outer circumferential portions of the two end-plates 22 press an outer circumferential portion 52 of the rotor core 21 from the both sides thereof, as shown in FIG. 6. Therefore, the outer circumferential portion 52 of the rotor core 21 is prevented from being damaged by receiving the centrifugal force or the magnetic force generated while the rotor 21 is rotated.

Each of the inner surfaces 36 of the two end-plates 22 forms a tapered angle from the inner circumferential portion 42 to the outer circumferential portion 41. However, the tapered angle may be formed only on one of the two end-plates 22. The tapered angle of each of the two end-plates 22 is determined depending on amount of laminated cores used to form the rotor core 21 or thickness of the rotor core 21, a type of material used for each of the two end-plate 22 or thickness of each of the two end-plate 22.

FIG. 6 schematically illustrates the cross-sectional diagram of the rotor 20, where the rotor core 21 is sandwiched by the two end-plates 22. In FIG. 6, the rotor core 21 including the plurality of the laminations is aligned by means of a jig or the like and placed on the inner surface of one of the two end-plates 22 that is placed in the bottommost of the rotor core 21. Then, the other of the two end-plates 22 is placed on the top of the rotor core 21. Each of end portions of the both surfaces of the rotor core 21 contacts the two end-plates 22 at its outer circumferential portion 41. Because of the structure of the tapered surfaces 37 formed on the end-plates 22, gaps are formed between the rotor core 21 and the two end-plates 22 from the outer circumferential portion 41, at which the end-plates 22 contact the end portions of the both surfaces of the rotor core 21, to the inner circumferential surface 42.

FIG. 7 schematically illustrates the cross-sectional diagram of the rotor 20, where the rotor core 21 is sandwiched by the two end-plates 22, which are fixed together by means of the rivet pins 23. As shown in FIG. 7, the rotor core 21 is pressed by the two end-plates 22 from bottom and top surfaces of the rotor core 21. Then, the rivet pins 23 are inserted into through holes 53 formed on the two end-plates 22 in order to rivet the rotor core 21 with the two end-plates 22.

Gaps 55 between the rotor core 21 and inner surfaces 36 of the two end-plates 22 are closed up by press fitting the two end-plates 22 to the rotor core 21. Intensity of pressure applied to the outer circumferential portion 52 of the rotor core 21 corresponds to the pressured applied to the two end-plates 22 in order to close up the gaps 55. The rotor core 21 including the plurality of the laminations is biased in a pressed direction where the two end-plates 22 press the rotor core 21 by elasticity generated on the rotor core 21. The intensity of the elasticity generated on the rotor core 21 depends on a type of material used for the end-plates 22 and other conditions of the end-plates 22. Therefore, the rotor core 21 is fixed by the elasticity, which is generated on the rotor core 21 in the pressed direction.

The outer circumferential portion 52 of the rotor core 21 is press-fitted and fixed by means of the two end-plates 22. Hence, the outer circumferential portion 52 of the rotor core 21 is prevented from being damaged even when the centrifugal force or force generated from the stator 10 because of magnetic circuit are acted on the rotor core 21. A size of each of the gaps 55 between the two end-plates 22 and the rotor core 21 is determined depending on a number of steel sheets used to form the rotor core 21 or thickness of the rotor core 21, a type of material used for the end-plates 22 or thickness of the end-plates 22.

According to the embodiment of the present invention, each of the two end-plates 22 is made of the pipe material 31 or the pipe material 32. Further, each of the two end-plates 22 is arranged at an end surfaces of the rotor core 21 including the plurality of the laminations in order to support the rotor core 21. The pipe material 31 is pressed in the axial direction thereof from either the end portion 33 or the other end portion 34 of the pipe material 31 in order to plastically deform the pipe material 31 in the plate-shape. Therefore, the amount of the waste materials produced during the manufacturing process of each of the two end-plates 22 is reduced and the productivity is improved. As a result, the manufacturing costs of each of the two end-plates 22 are reduced.

According to the embodiment of the present invention, each of the two end-plates 22 is made of the pipe material 31 or the pipe material 32. Further, the two end-plates 22 are provided on the both end surfaces of the rotor core 21 including the plurality of the laminations in order to support the rotor core 21. The pipe material 31 or the pipe material 32 is pressed in the axial direction thereof from either the end portion 33 or the other end portion 34 of the pipe material 31 or the pipe material 32 in order to plastically deform the pipe material 31 or the pipe material 32 in the plate-shape. Therefore, the amount of the waste materials produced during the manufacturing process of the end-plates 22 is reduced and the productivity is improved. As a result, the manufacturing costs of the end-plates 22 are reduced. The two end-plates 22 are provided to the motor in order to sandwich the rotor core 21 including the plurality of the laminations from both sides thereof.

According to the embodiment of the present invention, each of the two end-plates 22 is made of the pipe material 31 or the pipe material 32. Further, the two end-plates 22 are provided on the both end surfaces of the rotor core 21 including the plurality of the laminations in order to support the rotor core 21. The pipe material 31 or the pipe material 32 is pressed in the axial direction thereof from either the end portion 33 or the other end portion 34 in order to plastically deform the pipe material 31 or the pipe material 32 in the plate-shape having the tapered surface 37. Therefore, the amount of the waste materials produced during the manufacturing process of the end-plates 22 is reduced and the productivity is improved. As a result, the manufacturing costs of the end-plates 22 are reduced. The two end-plates 22 are provided to the motor in order to sandwich the rotor core 21 including the plurality of the laminations from both sides thereof.

According to the embodiment of the present invention, the pipe material 31 is plastically deformed by enlarging the diameter of the one end portion 33 of the pipe material 31 in order to form each of the two end-plates 22. Therefore, the productivity is improved.

According to the embodiment of the present invention, the electric resistance welded tube is used for the pipe material 31. Therefore, the manufacturing process of each of the two end-plates 22 creates less or no waste materials.

According to the embodiment of the present invention, each of the two end-plates 22 includes the tapered surface 37. Therefore, the productivity of the end-plates 22 is improved.

According to the embodiment of the present invention, the rotor core 21 is securely sandwiched by the two end-plates 22, which prevents the outer circumferential portion 52 of the rotor core 21 from being damaged.

According to the embodiment of the present invention, the outer circumferential portion of the two end-plates 22 press-fit and fix the rotor core 21 including the plurality of the laminations. As a result, the two end-plates 22 support the rotor core 21 more strongly and the outer circumferential portion 52 of the rotor core 21 is prevented from being damaged.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A method for manufacturing two plate-shaped end-plates specifically configured to be applied to a motor to sandwich a rotor of the motor and engage a rotatably supported shaft, the method for manufacturing each of the two plate-shaped end-plates comprising:
fixing a pipe of non-magnetic material so the pipe does not move, the pipe possessing an original axial length in an axial direction of the pipe, the pipe also possessing a first axial end and an opposite second axial end;
applying an axial force to the pipe of non-magnetic material, the first and second axial ends of the pipe each possessing an original outer diameter and an original inner diameter before the axial force is applied; and
the axial force being applied to cause plastic deformation of the pipe, to reduce the axial length of the pipe from the original axial length to a reduced axial length less than the original axial length and to increase the original outer diameter of the first axial end of the pipe to an increased outer diameter greater than the original outer diameter of the first axial end to produce the plate-shape end-plate having a central through hole.

2. The method according to claim 1, further comprising enlarging the inner diameter of the one axial end of the pipe before applying any axial force to the pipe.

3. The method according to claim 1, wherein the central through hole in the end-plate possess a diameter that is the same as the inner diameter of the second axial end of the pipe.

4. The method according to claim 1, wherein the axial force is applied from a side of the first axial end of the pipe.

5. The method according to claim 1, wherein the axial force is applied from a side of the second axial end of the pipe.

6. The method according to claim 1, wherein the plate-shape end-plate which results after application of the axial force is completed includes an outer circumferential periphery and an inner circumferential periphery, the inner circumferential periphery of the plate-shape end-plate which results after application of the axial force is completed possessing a thickness greater than the thickness of the outer circumferential periphery of the plate-shape end-plate which results after application of the axial force is completed.

7. The method according to claim 1, further comprising fixing the pipe against movement before the axial force is applied, and applying the axial force from a side of the second axial end of the pipe.

8. A method for manufacturing a plate-shape end-plate specifically configured to be applied to a motor and positioned on one axial end of a rotor core of the motor to restrain axial movement of the rotor core, the method comprising:
applying an axial force to a pipe of non-magnetic material, the pipe possessing an original axial length in an axial direction, the pipe also possessing a first axial end and a second axial end which are both open, the first axial end of the pipe possessing an original outer diameter and an original inner diameter before the axial force is applied to the pipe; and
the axial force being applied to reduce the axial length of the pipe from the original axial length to a reduced axial length less than the original axial length and to increase the original outer diameter of the first axial end of the pipe to an increased outer diameter greater than the original outer diameter of the first axial end to produce the plate-shape end-plate with a central through hole.

9. The method according to claim 8, further comprising:
before applying any axial force to the pipe, fixing the pipe on a die and enlarging an inner diameter and an outer diameter of the first axial end of the pipe through use of the punch; and
thereafter applying the axial force to the pipe.

10. The method according to claim 8, wherein the central through hole in the end-plate possess a diameter that is the same as an inner diameter of the second axial end of the pipe.

11. The method according to claim 8, wherein the plate-shape end-plate resulting following application of the axial force is completed possesses an outer circumferential periphery and an inner circumferential periphery, the outer circumferential periphery of the plate-shape end-plate which results after application of the axial force is completed possessing a thickness less than the thickness of the inner circumferential periphery of the plate-shape end-plate which results after application of the axial force is completed.

12. The method according to claim 8, further comprising fixing the pipe against movement before the axial force is applied, and applying the axial force from a side of the first axial end of the pipe.

13. A method for manufacturing a plate-shape end-plate specifically configured to be applied to a motor possessing a stator core and a rotor to restrain magnetic lines generated on the stator core in an axial direction of the rotor, the method comprising:
applying an axial force to a pipe material possessing one axial end and an opposite axial end, the one axial end of the pipe material possessing an original outer diameter before the applying of the axial force, the pipe material possessing an axial length; and
the axial force being applied to the pipe material to reduce the axial length of the pipe material and enlarge the original outer diameter of the one axial end of the pipe material to produce the end-plate possessing the plate-shape.

14. The method of claim 13, further comprising positioning the end-plate possessing the plate-shape at an axial end surface of the rotor of the motor.

15. The method according to claim 13, wherein the plate-shape end-plate which results after application of the axial force is completed includes an outer circumferential periphery and an inner circumferential periphery, the inner circumferential periphery of the plate-shape end-plate which results after application of the axial force is completed possessing a thickness greater than the thickness of the outer circumferential periphery of the plate-shape end-plate which results after application of the axial force is completed.

16. The method according to claim 13, further comprising enlarging the one axial end of the pipe, before applying any axial force to the pipe, so the one axial end of the pipe material possesses a tapering inner periphery.

* * * * *